(12) United States Patent
Kim et al.

(10) Patent No.: US 7,668,553 B2
(45) Date of Patent: Feb. 23, 2010

(54) MOBILE COMMUNICATION SYSTEM AND METHOD FOR CAPTURING INFORMATION OF OTHER MOBILE COMMUNICATION TERMINALS

(75) Inventors: Sung Choul Kim, Icheon-si (KR); Man Seok Kim, Seoul (KR)

(73) Assignee: Pantech Co., Ltd., Seoul (KR)

( * ) Notice: Subject to any disclaimer, the term of this patent is extended or adjusted under 35 U.S.C. 154(b) by 564 days.

(21) Appl. No.: 11/021,778

(22) Filed: Dec. 23, 2004

(65) Prior Publication Data

US 2005/0143093 A1 Jun. 30, 2005

(30) Foreign Application Priority Data

Dec. 26, 2003 (KR) ............ 10-2003-0097296
Nov. 2, 2004 (KR) ............ 10-2004-0088333

(51) Int. Cl.
*H04W 24/00* (2009.01)
(52) U.S. Cl. ............ 455/456.1; 455/404.1; 455/404.2
(58) Field of Classification Search ............ 455/404.1, 455/404.2, 456.1
See application file for complete search history.

(56) References Cited

U.S. PATENT DOCUMENTS

2001/0048364 A1* 12/2001 Kalthoff et al. .......... 340/573.1
2004/0249560 A1* 12/2004 Kim et al. .................. 701/117

FOREIGN PATENT DOCUMENTS

| JP | 2002-122652 | 4/2002 |
|----|-------------|--------|
| KR | 1020000037429 | 7/2000 |
| KR | 1020000044068 | 7/2000 |
| KR | 1020020054583 | 8/2002 |
| KR | 1020030041425 | 5/2003 |

* cited by examiner

*Primary Examiner*—Patrick N Edouard
*Assistant Examiner*—Wayne Cai
(74) *Attorney, Agent, or Firm*—H.C. Park & Associates, PLC

(57) ABSTRACT

Disclosed is a mobile communication system and a method for capturing information of other mobile communication terminals, that can identify criminal who harmed a user of mobile communication terminal based on information of the criminal's mobile communication terminal by capturing information of other mobile communication terminals, located within a certain distance from the user's mobile communication terminal when the crime happened, according to the user's instructions in an emergency situation.

There is provided a mobile communication system for capturing information of other mobile communication terminals, comprising: a first mobile communication terminal for transmitting capture signal, location information and identification information; the second mobile communication terminals for transmitting location information and identification information of the second mobile communication terminals; and a base station for transmitting the GPS means driving signal to the second mobile communication terminals and capturing information of the second mobile communication terminals.

6 Claims, 3 Drawing Sheets

MOBILE COMMUNICATION SYSTEM AND METHOD FOR CAPTURING INFORMATION OF OTHER MOBILE COMMUNICATION TERMINALS

CROSS-REFERENCE TO RELATED APPLICATIONS

The present application is claiming priorities of Korean Patent Application No. 10-2003-0097296, filed on Dec. 26, 2003, and Korean Patent Application No. 10-2004-0088333, filed on Nov. 2, 2004, the contents of which are incorporated herein by reference.

BACKGROUND OF THE INVENTION

1. Field of the Invention

The present invention relates to a mobile communication system. More particularly, the present invention relates to a mobile communication system and a method for capturing information of other mobile communication terminals, that can identify criminal who harmed a user of mobile communication terminal based on information of the criminal's mobile communication terminal by capturing information of other mobile communication terminals, located within a certain distance from the user's mobile communication terminal when the crime happened, according to the user's instructions in an emergency situation.

2. Description of the Related Art

Recently, with the development of mobile communication industry, the use of mobile communication service becomes universalized, so most people carry a mobile communication terminal to use mobile communication services.

Nevertheless, if people who carry a mobile communication terminal faces emergency situations (e.g., all people has possibilities to be attacked by criminals in a lonely place) and there is no way to keep enough evidence of crime by using the mobile communication terminal, there is no use carrying the mobile communication terminal.

The present invention is provided to solve the problem, and the object of the present invention is to provide a mobile communication system and method for capturing information of other mobile communication terminals, that can obtain identification information of criminal who harmed a user of mobile communication terminal based on information of the criminal's mobile communication terminal by capturing information of other mobile communication terminals, located within a certain distance from the user's mobile communication terminal when the crime happened, according to the user's instructions in an emergency situation.

BRIEF SUMMARY OF THE INVENTION

In order to achieve at least the above objects, in whole or in parts, there is provided a mobile communication system for capturing information of mobile communication terminals comprising: a first mobile communication terminal for transmitting capture signal along with location information and identification information of the first mobile communication terminal, the capture signal being a signal to instruct capture of information of second mobile communication terminals; the second mobile communication terminals for transmitting location information and identification information of the second mobile communication terminals when receiving global positioning system (GPS) means driving signal; and a base station for transmitting the GPS means driving signal to the second mobile communication terminals and capturing information of the second mobile communication terminals located near the first mobile communication terminal, when receiving the capture signal from the first mobile communication terminal.

Preferably, the first mobile communication terminal may comprise: an instructions input part for receiving instructions to capture information of the second mobile communication terminals; the GPS means for generating location information of the first mobile communication terminal based on GPS signal received from satellites; a control part for generating the capture signal and identification information and obtaining location information of the first mobile communication terminal by driving the GPS means, according to the instructions received through the instructions input part; and a transceiver part for transmitting the capture signal, the identification information of the first mobile communication terminal and the location information of the first mobile communication terminal to the base station.

Preferably, the second mobile communication terminal may comprise: the GPS means for generating location information of the second mobile communication terminal based on GPS signal received from satellites; a control part for obtaining location information of the second mobile communication terminal by driving the GPS means and generating identification information of the second mobile communication terminal, when receiving the GPS means driving signal from the base station; and a transceiver part for receiving the GPS means driving signal from the base station and transmitting the location information and the identification information of the second mobile communication terminal to the base station.

Preferably, the base station may comprise: a transceiver part for receiving the capture signal, the location information and the identification information from the first mobile communication terminal and transmitting the GPS means driving signal to the second mobile communication terminals; a central processing part for activating a process for capturing information of the second mobile communication terminals, making the transceiver part transmit the GPS means driving signal to the second mobile communication terminals located within a set distance from the first mobile communication terminal and, thus, capturing information of the second mobile communication terminals; and a data storing part for storing the information of the second mobile communication terminals captured through the central processing part, under controls of the central processing part.

Differently, there is provided a method of capturing information of other mobile communication terminals comprising: transmitting capture signal, identification information of a first mobile communication terminal and location information of the first mobile communication terminal from the first mobile communication terminal to a base station, according to instructions of the first mobile communication terminal to capture information of second mobile communication terminals; recognizing location of the first mobile communication terminal based on the capture signal, identification information and location information received by the base station and setting a range for capturing information based on the location of the first mobile communication terminal; transmitting a global positioning system (GPS) means driving signal from the base station to the second mobile communication terminals; obtaining location information of the second mobile communication terminals by driving GPS means of the second mobile communication terminals which received the GPS means driving signal and transmitting the location information of the second mobile communication terminals to the base station along with identification information of the second mobile communication terminals; and if the second mobile communication terminals are within the range, as a result of determination based on the location information of the second mobile communication terminals received by the base station, storing the location information and identification information of the second mobile communication terminals.

Preferably, the method of capturing information of other mobile communication terminals may further comprise: providing the stored location information and identification information of the second mobile communication terminals to other information user.

Differently, there is another method of capturing information of other mobile communication terminals comprising: transmitting capture signal, identification information of a first mobile communication terminal and location information of the first mobile communication terminal from the first mobile communication terminal to a base station, according to instructions of the first mobile communication terminal to capture information of second mobile communication terminals; recognizing location of the first mobile communication terminal based on the capture signal, identification information and location information received by the base station; transmitting a global positioning system (GPS) means driving signal from the base station to the second mobile communication terminals located within a pre-set distance from the first mobile communication terminal; obtaining location information of the second mobile communication terminals by driving GPS means of the second mobile communication terminals which received the GPS means driving signal and transmitting the location information of the second mobile communication terminals to the base station along with identification information of the second mobile communication terminals; and if the second mobile communication terminals are within the range, as a result of determination based on the location information of the second mobile communication terminals received by the base station, storing the location information and identification information of the second mobile communication terminals.

Preferably, the method of capturing information of other mobile communication terminals may further comprise: providing the stored location information and identification information of the second mobile communication terminals to other information user.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings.

Figure 1:
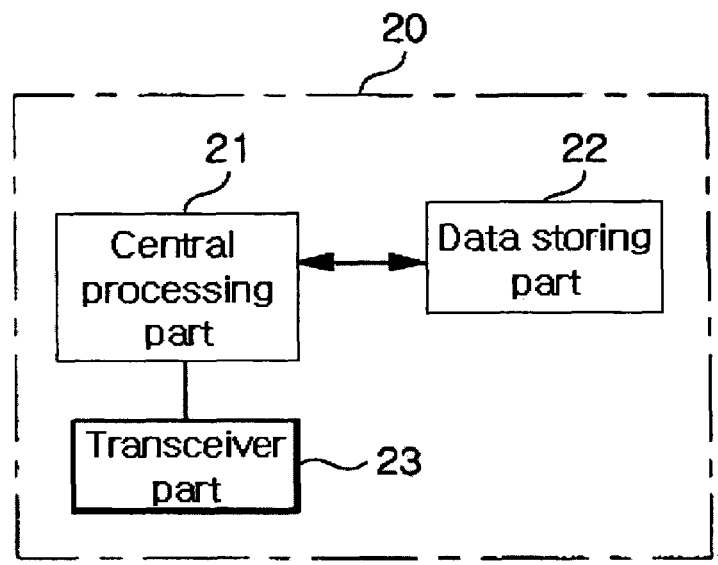
FIG. 1 illustrates a mobile communication system for capturing information of mobile communication terminals.
Figure 1:
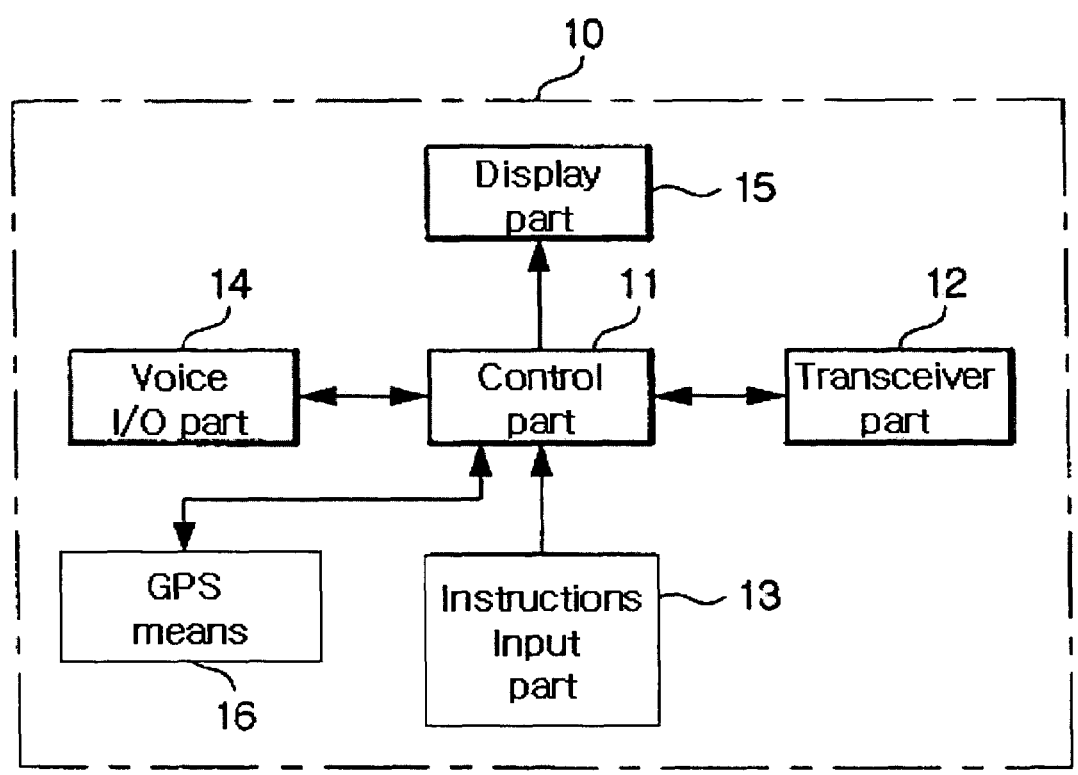

As illustrated in FIG. 1, a mobile communication system according to a preferred embodiment of the present invention comprises: mobile communication terminals 10 and a base station 20. The mobile communication terminal 10 comprises a control part 11, a transceiver part 12, an instructions input part 13, a voice input/output part 14, a display part 15 and global positioning system (GPS) means 16. The control part 11 controls general operation of the mobile communication terminal 10. The transceiver part 12 communicates with the base station 20. The instructions input part 13 is used for inputting information related to operation of the mobile communication terminal. The voice input/output part 14 processes voice signals inputted or outputted. The display part 15 displays information related to operations of the mobile communication terminal under controls of the control part 11. And, the GPS means 16 recognizes location of the mobile communication terminal based on information received from satellites and provides the location information to the control part 11. The instructions input part 13 comprises an operation button to instruct capture of information of other mobile communication terminals. Hereinafter, a mobile communication terminal that instructs capture of information will be termed as a first mobile communication terminal. On the other hand, mobile communication terminals of which information are captured by the first mobile communication terminal's instructions will be referred to as second mobile communication terminals. Herein, the second mobile communication terminal is not required to comprise the instructions input part 13, as with the first mobile communication terminal. If the operation button is pressed by user, the control part 11 makes the transceiver part 12 transmit to the base station 20 the location information of the first mobile communication terminal obtained by driving the GPS means 16, and capture signal to instruct capture of information of the second mobile communication terminals. When the control part 11 makes the transceiver part 12 transmit the location information of the first mobile communication terminal to the base station 20, it transmits identification number of the first mobile communication terminal and current time information to the base station 20 together.

The base station 20 ordinarily provides mobile communication service to the mobile communication terminals 10 including the first mobile communication terminal and the second mobile communication terminals and, in case of need, activates a process of capturing information of the second mobile communication terminals located within a certain distance from the first mobile communication terminal based on location of the first mobile communication terminal, according to instructions received from the first mobile communication terminal. The base station 20 comprises a central processing part 21, a data storing part 22 and a transceiver part 23. The central processing part 21 controls general operations of the base station 20 and proceeds with processes for capturing information of the second mobile communication terminals. The transceiver part 23 communicates with the mobile communication terminals 10 including the first mobile communication terminal and the second mobile communication terminals. The data storing part 22 stores information of the second mobile communication terminals captured under controls of the central processing unit 21.

With the above-described mobile communication system of the present invention, in case that the operation button to instruct capture of information of the second mobile communication terminals is pressed by user of the first mobile communication terminal in emergency situation, the first mobile communication terminal obtains location information of the first mobile communication terminal itself by driving the GPS means 16, and transmits capture signal and the location information of the first mobile communication terminal to the base station 20 through the transceiver part 12 of the first mobile communication terminal. If the base station 20 receives the capture signal and the location information from the first mobile communication terminal through transceiver part of the base station, the base station 20 activates process for capturing information of the second mobile communication terminals, recognizes location of the first mobile communication terminal and designates set range (for example, 10 m or 20 m from the first mobile communication terminal) based on the location of the first mobile communication terminal. Then, the base station 20 checks information of the second mobile communication terminals located within an area of the base station 20 and receives location information of the second mobile communication terminals through transceiver part of the base station 20 by transmitting GPS means driving signal to the second mobile communication terminals through the transceiver part of the base station 20. Thereafter, the base station 20 gathers information of the second mobile communication terminals (e.g., identification number, location information and current time information) and stores the information in the data storing part 22. As described above, by providing police station with information of the second mobile communication terminals, stored in the data storing part 22 of the base station 20, it is made possible to easily identify criminals who harms user of the first mobile communication terminal.

Figure 2:
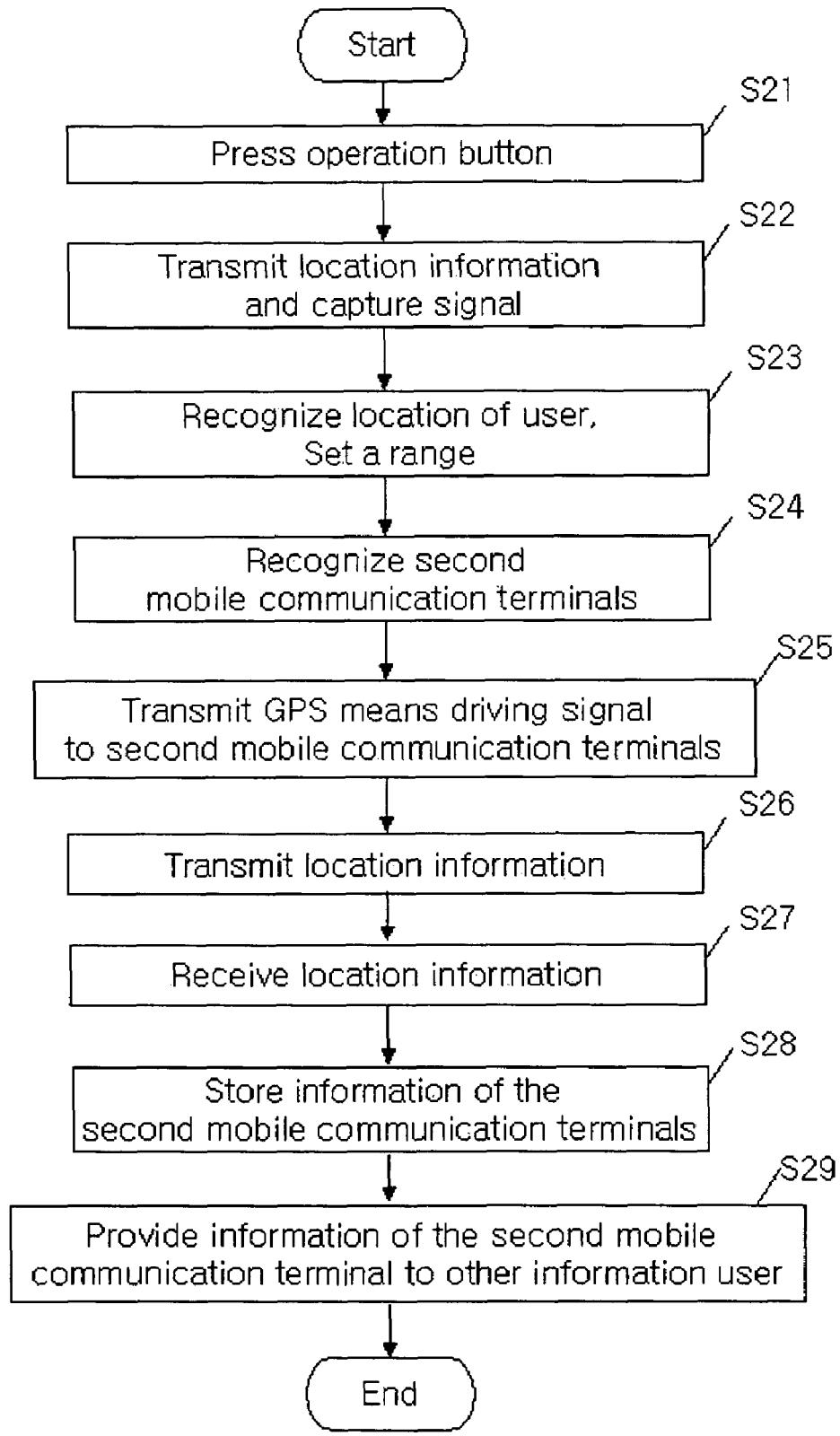
FIG. 2 is a flowchart illustrating a method of capturing information of mobile communication terminals.

The method for capturing information of other mobile communication terminals according to the present invention will be described with reference to the FIG. 2.

At first, a user of the first mobile communication terminal presses the operation button to instruct capture of information of the second mobile communication terminals in emergency situation (S21). Then, the control part 11 of the first mobile communication terminal obtains location information of the first mobile communication terminal itself and makes the transceiver part transmit to the base station 20 the location information of the first mobile communication terminal and capture signal to instruct capture of information of the second mobile communication terminals (S22).

Then, the transceiver part 23 of the base station 20 receives the location information and the capture signal from the first mobile communication terminal and forwards the location information and the capture signal to the central processing part 21. The central processing part 21 recognizes that capture of information of the second mobile communication terminals is instructed and activates a process to capture information of the second mobile communication terminals. And, the central processing part 21 recognizes location of the first mobile communication terminal and sets a range for capturing information of the second mobile communication terminals (e.g. 10 m or 20 m from the first mobile communication terminal) based on the location of the first mobile communication terminal (S23).

And, the central processing part 21 of the base station 20 recognizes the second mobile communication terminals located within an area of the base station (S24) and transmits GPS means driving signal to the second mobile communication terminals through transceiver part 23 (S25). At this time, the GPS means driving signal is a signal that instructs the second mobile communication terminals to drive the GPS means of the second mobile communication terminals. Then, the second mobile communication terminals drive their own GPS means to obtain their own location information and transmits to the base station 20 the location information, identification number of the second mobile communication terminals and current time information (S26). The base station 20 receives the location information, identification number of the second mobile communication terminals and current time information together (S27).

Figure 3:
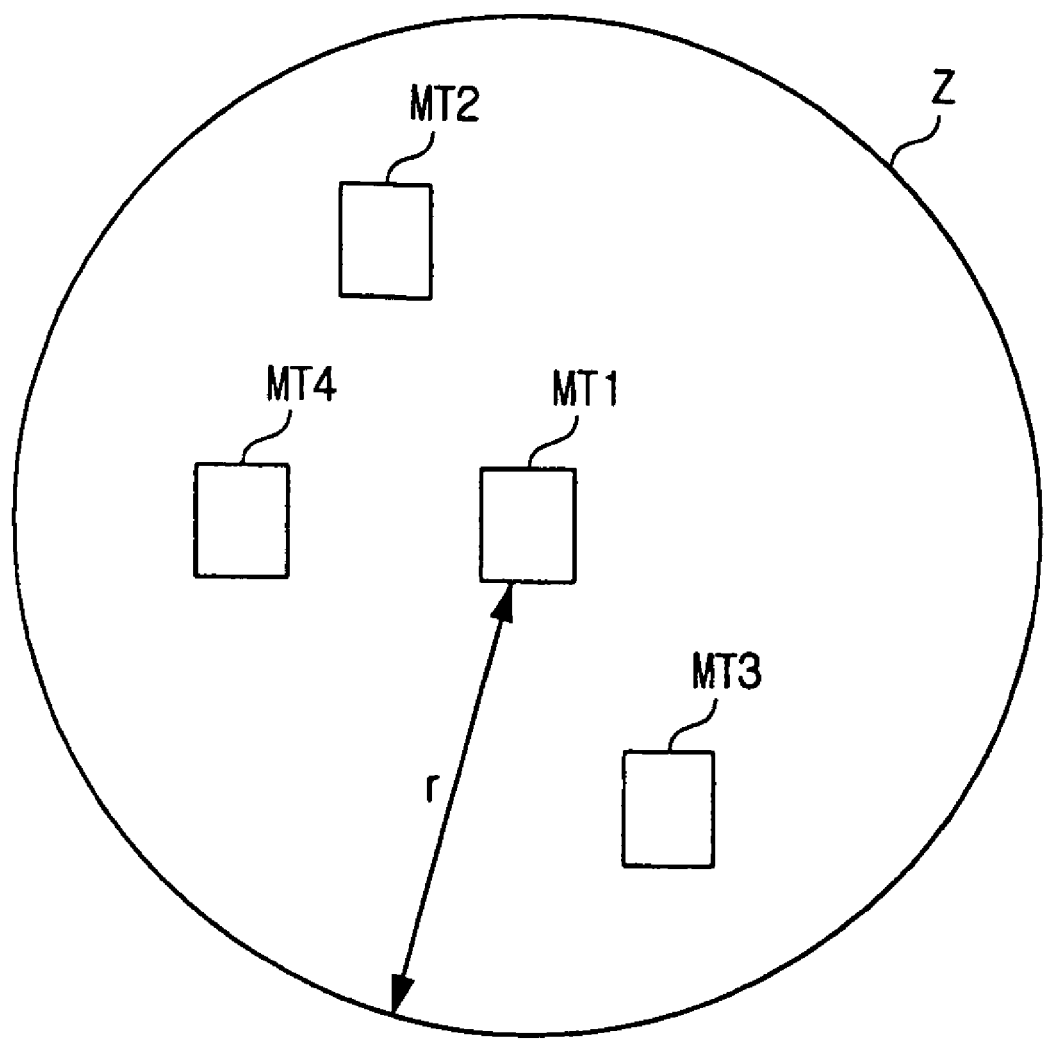
FIG. 3 illustrates a range where information of mobile communication terminals is captured.

At this time, the central processing part 21 of the base station 20 receives the location information, identification number of the second mobile communication terminals and current time information through the transceiver part 23 and recognizes the location information, identification number of the second mobile communication terminals and current time information. The central processing part 21 stores the location information, identification number of the second mobile communication terminals and current time information in the data storing part 22 (S28). By providing other information user such as police station with the information stored in the data storing part 22 (S29), it is made possible to easily identify criminals who harmed user of the first mobile communication terminal. For example, as illustrated in FIG. 3, the range (Z) for capturing information of the second mobile communication terminals is set to have a certain radius "r" based on location of the first mobile communication terminal (MT1) that instructed capture of information of the second mobile communication terminal. If one of users of the second mobile communication terminals (MT2~MT4) is a criminal who harmed user of the first mobile communication terminal (MT1), it is possible to easily obtain information of the criminal based on information of the second mobile communication terminals (MT2~MT4).

As described above, according to the present invention, by capturing information of the second mobile communication terminals located within a set distance from the first mobile communication terminal, according to instructions by user of the first mobile communication terminal in emergency situation, it is possible to easily identify criminal who harmed the user of the first mobile communication terminal.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A mobile communication system for capturing information of a mobile communication terminal, comprising:
   a first mobile communication terminal to transmit a capture signal, first location information of the first mobile communication terminal, and first identification information of the first mobile communication terminal; and
   a base station to receive the capture signal, the first location information, and the first identification information, to transmit a global positioning system (GPS) driving signal to a plurality of second mobile communication terminals within a first range of the base station in response to receiving the capture signal from the first mobile communication terminal, and to capture information of each second mobile communication terminal located within 20 meters of the first mobile communication terminal,
   wherein each of the plurality of second mobile communication terminals transmits second location information and second identification information to the base station in response to receiving the GPS driving signal.

2. The mobile communication system of claim 1, wherein the first mobile communication terminal comprises:
   an instructions input part to receive a user's instruction to capture information of the second mobile communication terminals;
   a first GPS receiver to generate the first location information of the first mobile communication terminal;

a control part to generate the capture signal and the first identification information of the first mobile communication terminal, and to obtain the first location information of the first mobile communication terminal by driving the first GPS receiver, according to the instruction received through the instructions input part; and a transceiver part to transmit the capture signal, the first identification information of the first mobile communication terminal, and the first location information of the first mobile communication terminal to the base station.

3. The mobile communication system of claim 2, wherein each second mobile communication terminal comprises:

a second GPS receiver to generate the second location information;

a control part to obtain the second location information by driving the second GPS receiver and to generate the second identification information in response to receiving the GPS driving signal from the base station; and a transceiver part to receive the GPS driving signal from the base station and to transmit the second location information and the second identification information to the base station.

4. The mobile communication system of claim 1, wherein the base station comprises:

a transceiver part to receive the capture signal, the first location information of the first mobile communication terminal, and the first identification information of the first mobile communication terminal from the first mobile communication terminal, and to transmit the GPS driving signal to the second mobile communication terminals;

a central processing part to activate a process for capturing the information of the second mobile communication terminals, and to control the transceiver part to transmit the GPS driving signal to the second mobile communication terminals; and a data storing part to store the second location information and the second identification information captured through the central processing part, under control of the central processing part.

5. A method for capturing information of a mobile communication terminal, comprising:

transmitting a capture signal and first location information of a first mobile communication terminal to a base station;

recognizing a location of the first mobile communication terminal based on the first location information;

transmitting a global positioning system (GPS) driving signal from the base station to each second mobile communication terminal located within a first range of the base station in response to receiving the capture signal from the first mobile communication terminal;

obtaining second location information of each second mobile communication terminal by driving a GPS receiver of each second mobile communication terminal with the GPS driving signal and transmitting the second location information of each second mobile communication terminal and identification information of each second mobile communication terminal to the base station;

determining a location of each second mobile communication terminal based on the second location information of each second mobile communication terminal; and storing the second location information and identification information of each second mobile communication terminal having a location within a second range of 20 meters of the first mobile communication terminal.

6. The method of claim 5, further comprising:

providing the stored second location information and identification information of each second mobile communication terminal having a location within the second range of the first mobile communication terminal to an information user.

* * * * *

UNITED STATES PATENT AND TRADEMARK OFFICE
CERTIFICATE OF CORRECTION

PATENT NO. : 7,668,553 B2
APPLICATION NO. : 11/021778
DATED : February 23, 2010
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 806 days.

Signed and Sealed this

Seventh Day of December, 2010

David J. Kappos
*Director of the United States Patent and Trademark Office*